(No Model.)
J. B. MITCHELTREE.
REFRIGERATING COVER FOR VESSELS.
No. 469,163. Patented Feb. 16, 1892.
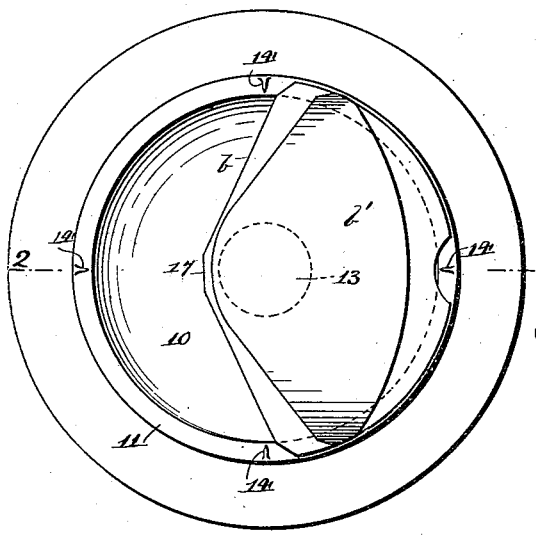
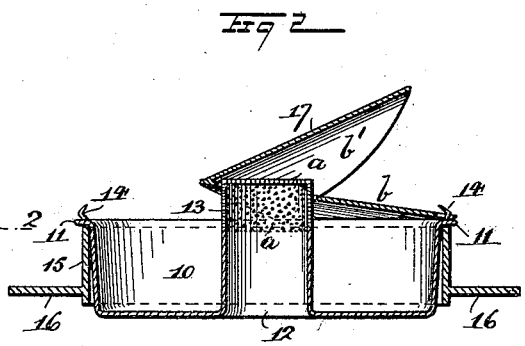
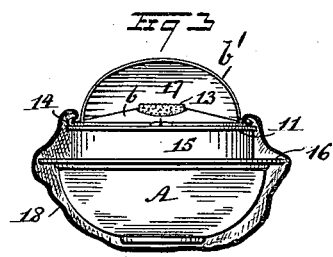
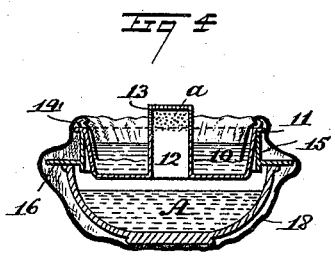
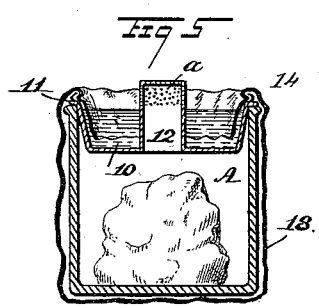
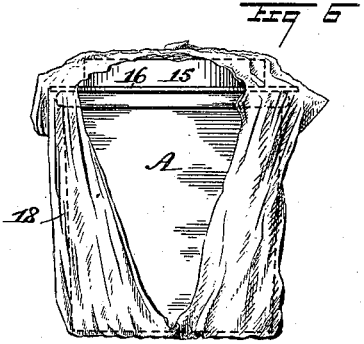
WITNESSES:
H. Walker
C. Sedgwick
INVENTOR:
J. B. Mitcheltree
BY Munn & Co.
ATTORNEYS

UNITED STATES PATENT OFFICE.

JAMES B. MITCHELTREE, OF BURNET, TEXAS.

REFRIGERATING-COVER FOR VESSELS.

SPECIFICATION forming part of Letters Patent No. 469,163, dated February 16, 1892.

Application filed December 9, 1890. Renewed January 16, 1892. Serial No. 418,239. (No model.)

*To all whom it may concern:*

Be it known that I, JAMES B. MITCHELTREE, of Burnet, in the county of Burnet and State of Texas, have invented a new and Improved Refrigerating-Cover for Vessels, of which the following is a full, clear, and exact description.

My invention relates to an improved refrigerating-cover for vessels, and has for its object to provide a simple, durable, and economic device capable of application to any receptacle which, in conjunction with an absorbent envelope and through the medium of capillary attraction, will cool the entire vessel or receptacle to which it is applied, and thereby preserve its contents in warm weather.

A further object of the invention is to provide a cover, by means of which the interior of a vessel will be thoroughly ventilated and any extraneous matter or insects effectually prevented from entering the same.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the cover. Fig. 2 is a central vertical section on line 2 2 of Fig. 1. Fig. 3 is a side elevation of a vessel having the cover applied and the envelope broken away. Fig. 4 is a central vertical section through a vessel and cover, the protective hood being removed. Fig. 5 is a central vertical section of a vessel and a slight modification of the cover, and Fig. 6 is a side elevation of a vessel and a further modification of the device.

The prime feature of the invention consists of a dish 10 of any desired contour, preferably circular, which dish is provided with an outwardly-extending horizontal marginal flange 11 and an opening 12 in its bottom, located, preferably, at its center, which opening is surrounded by an upwardly-extending tube 13 of greater height than the depth of the dish. The upper portion of the tube, likewise its cap or head, is perforated or reticulated, as shown at *a*. The flange of the dish is provided with a series of suitably-spaced hooks 14, and the tube 13 may constitute an integral portion of the dish or be secured thereto, as in practice may be found most desirable. The bottom of the dish may be made to rest upon the upper marginal edge of the vessel or receptacle A to be covered; but preferably the dish is supported in the upper portion of the vessel, as shown in Fig. 5, in which event the flange 11 of the dish rests upon the upper edge of the vessel.

When a very large vessel is to be covered, a collar 15 is employed to receive and support the dish, as shown in Fig. 2, the said collar being provided at or near it lower edge with a horizontal flange 16.

As shown in Figs. 3 and 4, when the supporting-collar is employed its flange is made to rest upon the upper margin of the vessel, and it is evident that when the cover is used either as shown in Fig. 4 or in Fig. 5 the perforated or reticulated tube will afford ample ventilation for the interior of the vessel, and that, whether the flange of the dish or the flange of the collar rests upon the vessel, the ingress of insects is effectually prevented. The ventilating-tube of the dish may, however, be dispensed with, as shown in Fig. 6; but its use is preferred; and when the tube is discarded the flange of the collar is flared upward, or a space is made to intervene it and the vessel at intervals, and air is thereby admitted to the vessel.

In order to prevent dust or any liquid spilled upon the cover from entering the vessel through the perforations of the ventilating-tube and for the purpose of obtaining better ventilation a hood 17 is removably fitted over the same. The hood comprises two members, the lower one *b* of which is nearly horizontal and provided with an opening to receive the upper end of the tube. The upper member *b'* is preferably curved and stands at an angle to the lower member, the inner edge of the upper member being securely attached to the corresponding edge of the lower member, as is best shown in Fig. 2, whereby an ample mouth is provided for the hood at its outer edge.

The outer edge of the lower member of the hood, and also that of the upper member, preferably corresponds to the contour of the dish, and the said outer edge of the lower member rests upon the edge of the dish, and a firm support for the hood is thereby obtained.

The cooling of the vessel to which the cover is applied is effected by capillary attraction in the following manner: Water is placed in the dish, and the bottom and sides of the vessel are covered by an absorbent envelope 18, consisting, preferably, of two strips of woven fabric, the upper edges of which are immersed in the water contained in the dish, and the ends of the fabric are held in this position by the hooks 14, as shown in Figs. 3, 4, and 5.

It will thus be understood that the entire exterior of the vessel may be constantly kept cool and the contents thereof preserved even in exceedingly warm weather.

Having thus described my invention, I claim as new and desire to secure by Letters Patent—

1. A cover comprising a dished receptacle provided with a central ventilating-tube and a hood partially covering the dished receptacle and projecting over the ventilating-tube, substantially as and for the purpose set forth.

2. A cover consisting of the dish-shaped receptacle 10, provided with the perforated tube 13, and the hood 17, formed of the section b, apertured to receive the perforated tube, and the section b', secured at an angle to the section b and projecting over the said perforated tube, substantially as herein shown and described.

JAMES B. MITCHELTREE.

Witnesses:
JAMES LINN,
T. A. ALTMAN.